United States Patent
Maruyama et al.

(10) Patent No.: US 10,050,293 B2
(45) Date of Patent: Aug. 14, 2018

(54) METHOD FOR OPERATING FUEL CELL SYSTEM AND METHOD FOR ESTIMATING COMPOSITION OF FUEL USED IN FUEL CELL SYSTEM

(71) Applicant: Panasonic Intellectual Property Management Co., Ltd., Osaka (JP)

(72) Inventors: Takehiro Maruyama, Osaka (JP); Kunihiro Ukai, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 224 days.

(21) Appl. No.: 14/923,854

(22) Filed: Oct. 27, 2015

(65) Prior Publication Data

US 2016/0156050 A1 Jun. 2, 2016

(30) Foreign Application Priority Data

Nov. 28, 2014 (JP) .................... 2014-241196

(51) Int. Cl.
*H01M 8/06* (2016.01)
*H01M 8/04* (2016.01)
(Continued)

(52) U.S. Cl.
CPC ..... *H01M 8/0618* (2013.01); *H01M 8/04373* (2013.01); *H01M 8/04776* (2013.01); *H01M 2008/1293* (2013.01)

(58) Field of Classification Search
CPC .......... H01M 8/0618; H01M 8/04373; H01M 8/04776; H01M 2008/1293
See application file for complete search history.

(56) References Cited

U.S. PATENT DOCUMENTS

| 6,585,785 B1 | 7/2003 | Warren et al. |
| 2011/0136031 A1* | 6/2011 | Sato .................... H01M 8/0432 429/442 |

(Continued)

FOREIGN PATENT DOCUMENTS

| DE | 102012023438 | 6/2014 |
| JP | 2009081052 A * | 4/2009 |

(Continued)

OTHER PUBLICATIONS

J-PlatPat Machine Translation of the detailed description of JP 2009-081052A (Year: 2009).*

(Continued)

*Primary Examiner* — Gregg Cantelmo
(74) *Attorney, Agent, or Firm* — McDermott Will & Emery LLP

(57) ABSTRACT

A method for operating a fuel cell system including a fuel feeder supplying fuel, a reformer producing a hydrogen-containing gas by a reforming reaction, a fuel cell which includes a cathode and an anode, a combustor which combusts an anode off-gas discharged from the anode to produce a combustion gas, a temperature detector detecting the temperature of the combustion gas, and a storage device storing a preset target temperature profile, the target temperature profile including the temporal change in target temperature of the combustion gas in the operation of the fuel cell system, includes controlling the flow rate of the fuel supplied from the fuel feeder to the reformer in the operation such that the temperature detected by the temperature detector becomes equal to a target temperature determined on the basis of the target temperature profile.

14 Claims, 6 Drawing Sheets

(51) Int. Cl.
  *H01M 8/0612*  (2016.01)
  *H01M 8/0432*  (2016.01)
  *H01M 8/04746*  (2016.01)
  *H01M 8/124*  (2016.01)

(56) References Cited

U.S. PATENT DOCUMENTS

2014/0342257 A1\* 11/2014 Tsukagoshi ............... F23N 1/00
                     429/425
2015/0044587 A1  2/2015 Matsuo et al.

FOREIGN PATENT DOCUMENTS

| JP | 2012104434 A | \* | 5/2012 | .......... H01M 8/0625 |
| WO | 2013/001753 | | 1/2013 | |
| WO | WO-2013111777 A1 | \* | 8/2013 | .............. F23N 1/00 |
| WO | 2013/153944 | | 10/2013 | |

OTHER PUBLICATIONS

The Extended European Search Report dated Mar. 30, 2016 for the related European Patent Application No. 15193094.8.

\* cited by examiner

METHOD FOR OPERATING FUEL CELL SYSTEM AND METHOD FOR ESTIMATING COMPOSITION OF FUEL USED IN FUEL CELL SYSTEM

BACKGROUND

1. Technical Field

The present disclosure relates a method for operating a fuel cell system and a method for estimating the composition of fuel used in a fuel cell system.

2. Description of the Related Art

International Publication No. WO 2013/001753 discloses a fuel cell system including a high-temperature operating fuel cell; a plurality of fuel supply lines for supplying several types of fuels to the fuel cell, properties of the fuels, that is, the composition and calorific value per unit volume of the fuels varying, the fuels being different in properties from each other; a mixing tube which merges with the fuel supply lines and which is connected to the fuel cell; and a fuel mixture property measurement unit which is attached to the mixing tube and which measures the flow rate and properties of a fuel mixture. A steam pipe including a steam flow control valve is connected to the upstream side of a reformer which includes a current density control unit that controls the current density and which is attached to the mixing tube. A fuel cell control unit which receives a signal from the fuel mixture property measurement unit to control the steam flow control valve is placed. The composition, calorific value per unit volume, and flow rate of the fuel mixture are measured by the fuel mixture property measurement unit. The fuel cell control unit determines the content of carbon in the fuel mixture from the ratio between higher hydrocarbon components contained in the fuel mixture, determines the content of hydrogen in the fuel mixture from the supply of steam at that point in time to compute the ratio of carbon to hydrogen, and judges whether the computed ratio of carbon to hydrogen is within the range of 1:5 to 1:15. When the computed ratio of carbon to hydrogen is outside this range, the fuel cell control unit controls the steam flow control valve to regulate the supply of steam such that the ratio of carbon to hydrogen in the fuel mixture is within this range. When the computed ratio of carbon to hydrogen is within this range, the fuel cell control unit maintains the supply of steam.

International Publication No. WO 2013/153944 discloses a method for controlling the mass flow rate of steam in a hydrogen production plant that includes a mass flowmeter measuring the mass flow rate of a source gas and also includes a control processor which computes the mass flow rate of carbon contained in the source gas on the basis of the mass flow rate measured by the mass flowmeter and which outputs a signal for controlling the flow rate of steam to a steam flow regulator on the basis of the mass flow rate of carbon. The method includes allowing the control processor to calculate the mass flow rate of carbon contained in the source gas on the basis of the ratio of the mass flow rate measured by the mass flowmeter to the approximate mass of carbon supposed to be contained in the source gas, allowing the control processor to correct the computed value with a correction value preset to the source gas, and allowing the control processor to control the mass flow rate of steam on the basis of the corrected value.

SUMMARY

One non-limiting and exemplary embodiment provides the increase in durability of a fuel cell system.

In one general aspect, the techniques disclosed here feature a method for operating a fuel cell system including a fuel feeder supplying fuel, a reformer producing a hydrogen-containing gas by a reforming reaction using a reaction gas other than fuel and the fuel supplied from the fuel feeder, a fuel cell which includes a cathode and an anode and which generates electricity using an oxidant gas supplied to the cathode and the hydrogen-containing gas supplied from the reformer to the anode, a combustor which combusts an anode off-gas discharged from the anode to produce a combustion gas, a temperature detector detecting the temperature of the combustion gas, and a storage device storing a preset target temperature profile, the target temperature profile including the temporal change in target temperature of the combustion gas in the operation of the fuel cell system. The method includes controlling the flow rate of the fuel supplied from the fuel feeder to the reformer in the operation such that the temperature detected by the temperature detector becomes equal to a target temperature determined on the basis of the target temperature profile.

An aspect of the present disclosure provides an effect that the durability of a fuel cell system can be increased because of a simple system configuration.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
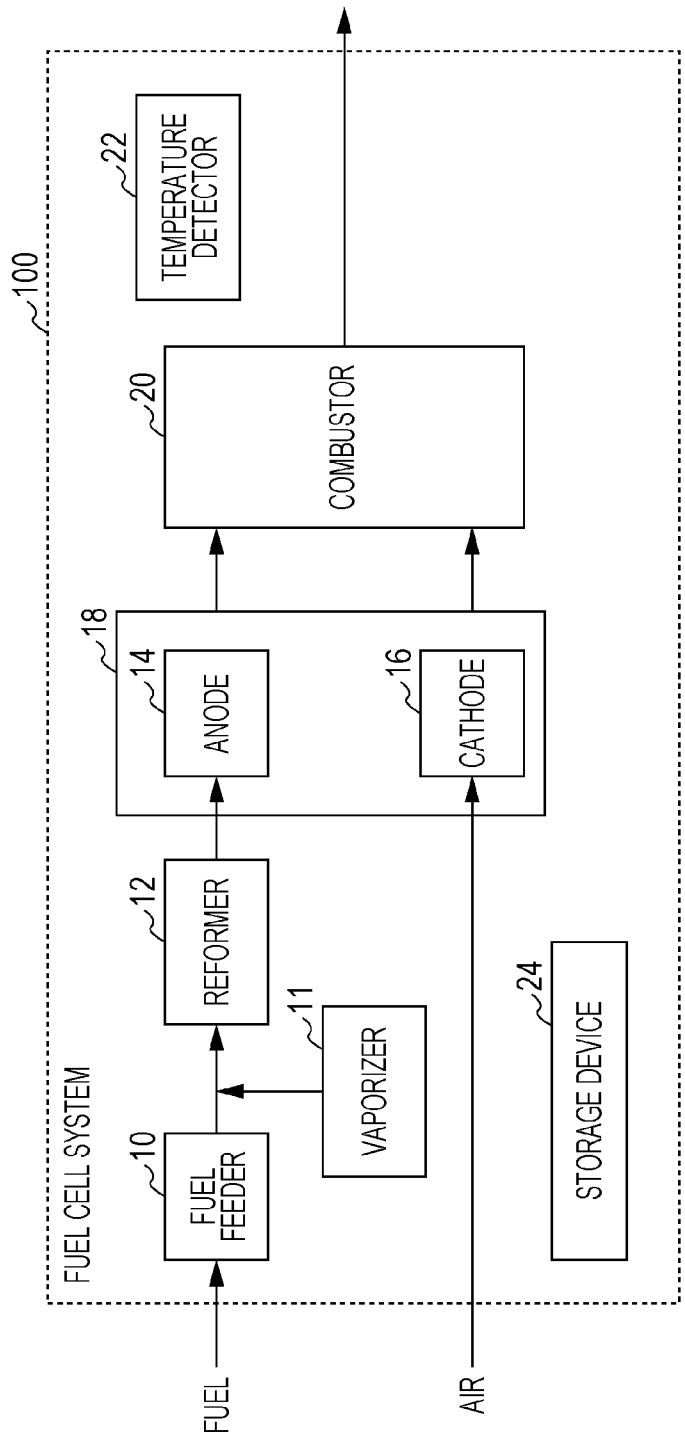
FIG. 1 is a block diagram illustrating the schematic configuration of a fuel cell system that is an example of a fuel cell system according to a first or second embodiment.

Intensive investigations have been made to increase the durability of fuel cell system. As a result, findings below were obtained.

In fuel cell systems using fuels such as liquefied petroleum gas (LPG) filled in a cylinder and city gas supplied through gas pipelines in Europe, the composition and calorific value of the fuels vary with time. The temperatures of fuel cell stacks, reformers, combustors, and the like possibly deviate significantly from design values because of the variation. When temperature control is insufficient, the fuel cell systems may possibly be damaged by thermal degradation at high temperature, carbon deposition at low temperature, starvation, and the like.

The term "carbon deposition" refers to a phenomenon in which carbon is deposited in a stack channel or the like because, for example, the disproportionation reactions ($CH_4 \rightarrow C+2H_2$ and $2CO \rightarrow C+CO_2$) of a hydrocarbon and carbon monoxide contained in a hydrogen-containing gas are caused by the decrease in temperature of a fuel cell stack.

Term "starvation" refers to a phenomenon in which an electrode catalyst, such as nickel, contained in an anode is oxidized because, for example, the flow rate of a hydrogen-containing gas supplied to an anode during power generation is insufficient. Nickel is oxidized to expand. When a sufficient amount of the hydrogen-containing gas is supplied to the anode and therefore the surroundings of the anode become reductive again, nickel is reduced to contract. Repeating expansion and contraction may possibly damage fuel cells.

Particularly at start-up, temperature variations in a fuel cell system are large and therefore the possibility of damaging the fuel cell system is likely to be high. If the composition of fuel varies and therefore fuel utilization, S/C, and the like deviate significantly from design values during power generation after start-up, then the fuel cell system may possibly be damaged.

In the fuel cell system, a possible method for detecting the variation of the fuel composition is a method using a calorimeter, a gas chromatograph, a mass flowmeter, and the like. However, the use of these specific devices leads to an increase in cost.

It has been appreciated that, in a fuel cell system including a combustor that produces a combustion gas by allowing a cathode off-gas discharged from a cathode to react with an anode off-gas discharged from an anode, a temperature detector detecting the temperature of the combustion gas, and a storage device storing a preset target temperature profile, the target temperature profile including the temporal change in target temperature of the combustion gas in the start-up operation of the fuel cell system, the flow rate of fuel supplied from a fuel feeder to a reformer is controlled in the start-up operation such that the temperature detected by the temperature detector becomes equal to a target temperature determined on the basis of the target temperature profile.

Furthermore, it has been appreciated that, in a fuel cell system including a combustor that produces a combustion gas by allowing a cathode off-gas discharged from a cathode to react with an anode off-gas discharged from an anode, a temperature detector detecting the temperature of the combustion gas, and a storage device storing a preset target temperature profile, the target temperature profile including the temporal change in target temperature of the combustion gas in the start-up operation of the fuel cell system, the flow rate of fuel supplied from a fuel feeder to a reformer is controlled in the start-up operation such that the temperature detected by the temperature detector becomes equal to a target temperature determined on the basis of the target temperature profile and the composition of the fuel is estimated on the basis of the flow rate of the fuel in the start-up operation.

In the above cases, the durability of the fuel cell systems can be increased with a simple system configuration. In the case of estimating the composition of fuel, the use of the estimated fuel composition enables the possibility of causing over-heating, carbon deposition, starvation, or the like during power generation to be reduced.

Embodiments of the present disclosure are described below with reference to the attached drawings.

Each of the embodiments shows an example of the present disclosure. Values, shapes, materials, components, the positions and connection topology of the components, steps, and the order of the steps described in the embodiments are for exemplification only and are not intended to limit the present disclosure. Among the components in the embodiments, those that are not described in any independent claim which represents the highest conception are arbitrary components. In the drawings, those represented by the same reference numerals are not described in some cases. The drawings schematically show components for better understanding and therefore a shape, a dimensional ratio, and the like are not accurately shown in some cases. In a production method, the order of steps may be changed as required and a known step may be added.

First Embodiment

A method for operating a fuel cell system according to a first embodiment, the fuel cell system including a fuel feeder supplying fuel, a reformer producing a hydrogen-containing gas by a reforming reaction using a reaction gas other than the fuel and the fuel supplied from the fuel feeder, a fuel cell which includes a cathode and an anode and which generates electricity using an oxidant gas supplied to the cathode and the hydrogen-containing gas supplied from the reformer to the anode, a combustor which combusts an anode off-gas discharged from the anode to produce a combustion gas, a temperature detector detecting the temperature of the combustion gas, and a storage device storing a preset target temperature profile, the target temperature profile including the temporal change in target temperature of the combustion gas in the operation of the fuel cell system, includes controlling the flow rate of the fuel supplied from the fuel feeder to the reformer in the operation such that the temperature detected by the temperature detector becomes equal to a target temperature determined on the basis of the target temperature profile.

In the above case, the durability of the fuel cell system can be increased with a simple system configuration.

In the method for operating the fuel cell system, the composition of the fuel supplied in the operation may be estimated on the basis of the flow rate of the fuel in the operation and the composition of the fuel that is used as a basis for setting the target temperature profile.

The term "flow rate of fuel in operation" may refer to, for example, the flow rate of fuel at the end of start-up operation, the flow rate of fuel at the start of power generation operation, or the average flow rate of fuel in a predetermined period including at least one start-up operation hour.

In the method for operating the fuel cell system, the fuel cell may be a solid oxide fuel cell.

In the method for operating the fuel cell system, a major component of the fuel may be an alkane.

Second Embodiment

A method for estimating the composition of fuel used in a fuel cell system according to a second embodiment, the fuel cell system including a fuel feeder supplying fuel, a reformer producing a hydrogen-containing gas by a reforming reaction using a reaction gas other than fuel and the fuel supplied from the fuel feeder, a fuel cell which includes a cathode and an anode and which generates electricity using an oxidant gas supplied to the cathode and the hydrogen-containing gas supplied from the reformer to the anode, a combustor which combusts an anode off-gas discharged from the anode to produce a combustion gas, a temperature detector detecting the temperature of the combustion gas, and a storage device storing a preset target temperature profile, the target temperature profile including the temporal change in target temperature of the combustion gas in the operation of the fuel cell system, includes controlling the flow rate of the fuel supplied from the fuel feeder to the reformer in the operation such that the temperature detected by the temperature detector becomes equal to a target temperature determined on the basis of the target temperature profile and estimating the composition of the fuel on the basis of the flow rate of the fuel in the operation.

In this case, the durability of the fuel cell system can be increased with a simple system configuration.

The term "flow rate of fuel in operation" may refer to the flow rate of fuel at the end of start-up operation, the flow rate of fuel at the start of power generation operation, or the average flow rate of fuel in a predetermined period including at least one start-up operation hour.

In the method for estimating the composition of fuel, the composition of the fuel supplied in the operation may be estimated on the basis of the flow rate of the fuel in the operation and the composition of the fuel that is used as a basis for setting the target temperature profile.

In the method for estimating the composition of fuel, the fuel cell may be a solid oxide fuel cell.

In the method for estimating the composition of fuel, a major component of the fuel may be an alkane.

System Configuration

FIG. 1 is a block diagram illustrating the schematic configuration of a fuel cell system 100 that is an example of the fuel cell system according to the first or second embodiment. The fuel cell system 100 is described below with reference to FIG. 1.

As shown in FIG. 1, the fuel cell system 100 includes a fuel feeder 10, a reformer 12, a fuel cell 18 including an anode 14 and a cathode 16, a combustor 20, a temperature detector 22, and a storage device 24.

The fuel feeder 10 supplies fuel. In particular, the fuel feeder 10 may supply the fuel to the reformer 12 through a fuel supply channel (not shown). The fuel feeder 10 may be composed of a fuel tank, a gas cylinder, a blower, a pump, a flow control valve, and the like. The fuel feeder 10 may be capable of detecting the flow rate of the supplied fuel. The detected flow rate thereof may be transmitted to a controller below. Aside from the fuel feeder 10, a flow detector detecting the flow rate of the fuel may be placed.

The fuel may be, for example, a substance containing an organic compound containing carbon and hydrogen. Examples of the fuel include hydrocarbons such as natural gas, city gas, LPG, liquefied natural gas (LNG), propane gas, butane gas, and gas mainly containing methane; alcohols such as methanol and ethanol; and kerosene. The term "city gas" refers to gas supplied from a gas company to individual homes through a grid. In the case of using a liquid source such as kerosene or alcohol to generate electricity, the liquid source may be vaporized by heating before the liquid source is supplied to the reformer 12. A major component of the fuel may be an alkane represented by the formula $C_nH_{2n+2}$. An example of the alkane is methane. The major component means that the component is contained in an amount of not less than 50% by volume, preferably not less than 70% by volume.

The reformer 12 produces a hydrogen-containing gas by a reforming reaction using a reaction gas other than the fuel and the fuel supplied from the fuel feeder 10. The reaction gas may be steam, air, or the like. The reaction gas may be supplied to the reformer 12 through a reaction gas supply channel (not shown). When the reaction gas contains steam, steam may be produced in the reformer 12 or a vaporizer 11 may be placed outside the reformer 12. Reforming water vaporized in the vaporizer 11 is mixed with the fuel supplied from the fuel feeder 10.

Examples of the reforming reaction include a steam reforming reaction and an oxidative steam reforming reaction. The reforming reaction proceeding in the reformer 12 can vary depending on the reaction gas supplied to the reformer 12. When the reaction gas is, for example, steam, the steam reforming (SR) reaction can proceed. When the reaction gas is a mixture of steam and air, an oxidative steam reforming (OSR) reaction can proceed.

The reformer 12 may be composed of, for example, a vessel and a reforming catalyst filled therein. The reforming catalyst allows the reforming reaction to proceed, whereby the hydrogen-containing gas is produced from the fuel and water. In general, the reforming catalyst preferably contains at least one selected from the group consisting of noble metals such as platinum (Pt), ruthenium (Ru), and rhodium (Rh) and nickel (Ni). In particular, for example, an alumina support impregnated with at least one of Pt and Ru may be used. The reforming catalyst is not particularly limited and may be made of any material as long as the reforming catalyst allows the reforming reaction to proceed when the reforming catalyst is maintained within an optimum temperature range. The reformer 12 may be attached to the reaction gas supply channel and may include a vaporizer.

The hydrogen-containing gas produced in the reformer 12 is supplied to the anode 14 of the fuel cell 18 through a hydrogen-containing gas supply channel (not shown).

The reformer 12 may be provided with appropriate devices, which are not shown in FIG. 1, necessary for the reforming reaction. When the reforming reaction is the steam reforming reaction, the reformer 12 may be provided with, for example, a combustor heating the reformer 12, a vaporizer producing steam, and a water feeder. The vaporizer may be configured such that the outer surface of a vessel through which water passes is heated with a combustion gas. The water feeder used may be, for example, a positive-displacement pump such as a gear pump or a plunger pump.

Fuel for the combustor heating the reformer 12 may be any type of fuel and may be, for example, the hydrogen-containing gas discharged from the reformer 12 or an anode off-gas. A heat source for producing steam is not particularly limited and may be, for example, any one of a combustor, an electric heater, a reformer, and a fuel cell or an arbitrary combination of these devices. When the reforming reaction is the oxidative steam reforming reaction, the reformer 12 may be further provided with an air feeder (not shown) supplying air to the reformer 12.

The fuel cell 18 generates electricity using an oxidant gas supplied to the cathode 16 and the hydrogen-containing gas supplied from the reformer 12 to the anode 14. The fuel cell 18 may be a solid oxide fuel cell. The oxidant gas may be, for example, air or oxygen.

In the fuel cell 18, electricity can be generated by electrochemical reactions below using, for example, the hydrogen-containing gas (reforming gas) supplied to the anode 14 and oxygen in air supplied to the cathode 16.

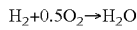

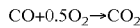

When fuel cell 18 is the solid oxide fuel cell, oxygen ions migrate from the cathode 16 to anode 14 through an electrolyte to cause the electrochemical reactions. Therefore, the electrochemical reactions take place on the anode 14. $H_2O$ and $CO_2$ produced by the electrochemical reactions and the hydrogen-containing gas not consumed in the electrochemical reactions are discharged from the anode 14 in the form of the anode off-gas and are then supplied to the combustor 20.

The oxidant gas can be supplied to the cathode 16 through an oxidant gas supply channel (not shown). An oxidant gas feeder (not shown) may be attached to the oxidant gas supply channel. The oxidant gas feeder used may be, for example, a blower or the like.

The fuel cell 18 is configured to include, for example, a stack of a plurality of single cells which carry out a power generation reaction between an anode and a cathode to generate electricity and which are connected in series. The fuel cell 18 may be configured to include a planar stack in which planar single cells and members such as interconnectors are stacked. The fuel cell 18 may be configured to include a tubular stack in which tubular single cells and members such as interconnectors are bundled, are fixed, and are connected in series.

The stack may be a closed type of stack in which the anode off-gas and a cathode off-gas are discharged without being mixed or may be an open type of stack in which the anode off-gas and the cathode off-gas are mixed together and are then discharged. When the stack is of an open type, the anode off-gas and the cathode off-gas may be combusted after being mixed in a mixer placed directly after the stack.

The single cells may have known configuration in which, for example, yttria-stabilized zirconia (YSZ) is used in an electrolyte or the like. A material for the single cells may be zirconia doped with yttrium or scandium or a lanthanum gallate-based solid electrolyte. In a single cell containing yttria-stabilized zirconia, the power generation reaction is carried out within a temperature range of about 600° C. to 1,000° C. depending on the thickness of an electrolyte.

The fuel cell 18 includes a terminal (not shown). The electricity generated by the fuel cell 18 is supplied to an external load through the terminal. A DC/DC converter or an AC/DC converter may be placed between the terminal and the external load.

The combustor 20 combusts the anode off-gas, which is discharged from the anode 14, to produce a combustion gas. The combustion gas may be discharged outside the fuel cell system 100 through a combustion gas channel (not shown).

The combustor 20 may combust the cathode off-gas, which is discharged from the cathode 16, and the anode off-gas, which is discharged from the anode 14, to produce the combustion gas. In this case, the combustor 20 is connected to the cathode 16 through a cathode off-gas channel (not shown) and is connected to the anode 14 through an anode off-gas channel (not shown).

In order to combust the anode off-gas, the combustor 20 may be supplied with another oxidant gas (for example, air or the like taken from outside the fuel cell system 100) instead of or in addition to the cathode off-gas. The combustion gas may be supplied to the combustion gas channel in such a manner that the combustion gas is obtained by combusting the anode off-gas using the air taken from outside the fuel cell system 100 and is mixed with the cathode off-gas.

The combustor 20 may be used to heat the reformer 12. Alternatively, the combustion gas may be used to heat the reformer 12. The reformer 12 may be directly heated with the combustion gas or may be indirectly heated with, for example, a heat exchanger (not shown) that exchanges heat with the combustion gas. In the latter case, the reformer 12 may include the heat exchanger. The heat exchanger may be attached to the combustion gas channel. The combustion gas discharged from the heat exchanger may be discharged outside the fuel cell system 100.

The temperature detector 22 detects the temperature of the combustion gas. The temperature detector 22 used may be, for example, a thermistor, thermocouple, or the like. As long as the temperature of the combustion gas can be detected, the temperature detector 22 may be placed in any location. In particular, the temperature detector 22 may be attached to the combustor 20, the combustion gas channel, the reformer 12, or the fuel cell 18. In the case where the temperature detector 22 is attached to the combustion gas channel, the variation of the composition and calorific value of fuel can be actually detected.

The storage device 24 stores a preset target temperature profile. The storage device 24 may be, for example, a memory or the like. Alternatively, the storage device 24 may be a controller. The controller may be one having a control function and includes an arithmetic processing section and a storage section storing a control program. Examples of the controller include microcontrollers and programmable logic controllers (PLCs). Examples of the arithmetic processing section include micro-processing units (MPUs) and central processing units (CPUs). Examples of the storage section include memories. The controller may be composed of a single control unit performing centralized control or a plurality of control units performing decentralized control in cooperation.

When the storage device 24 is the controller, the temperature detected by the temperature detector 22 may be transmitted to the controller. The controller may be a flow controller controlling the flow rate of the fuel supplied from the fuel feeder 10 to the reformer 12.

The target temperature profile includes the temporal change in target temperature of the combustion gas in the operation of the fuel cell system 100. The target temperature profile may include the target temperature of the combustion gas in operation other than start-up operation and other information. One may be selected from a plurality of target temperature profiles depending on outside air temperature. Alternatively, the target temperature profile may be produced or corrected by a preset method depending on outside air temperature. The term "preset target temperature profile" can be defined as one that includes these forms.

Operating Method

A method for operating the fuel cell system 100 includes controlling the flow rate of the fuel supplied from the fuel feeder 10 to the reformer 12 such that the temperature detected by the temperature detector 22 becomes equal to a target temperature determined on the basis of the target temperature profile.

Figure 2:
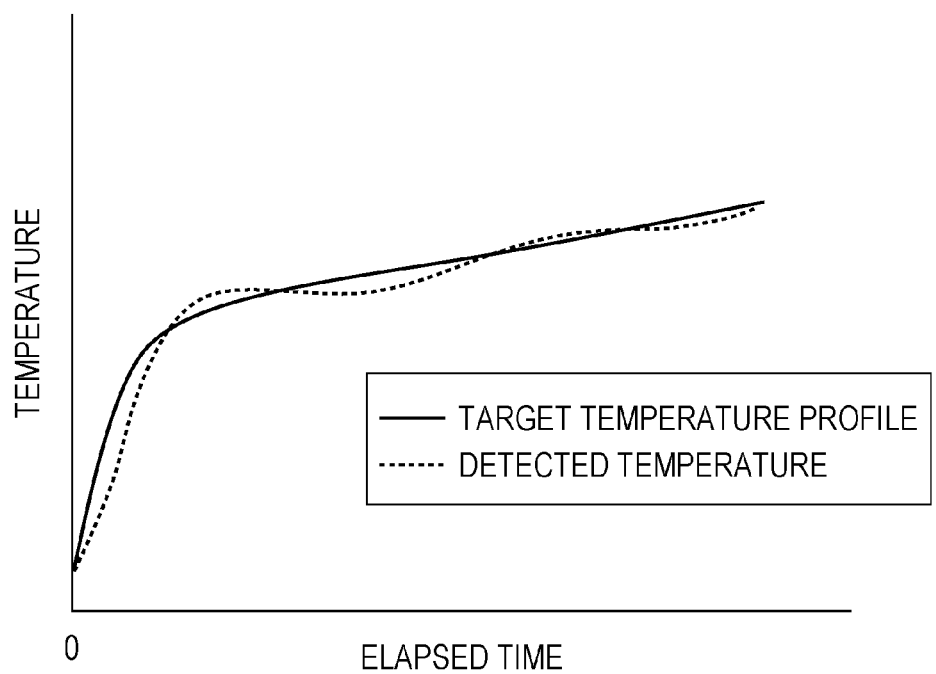
FIG. 2 is a conceptual graph showing the relationship between the time elapsed from the start-up of the fuel cell system according to the first embodiment and a detected temperature.

FIG. 2 is a conceptual graph showing the relationship between the time elapsed from the beginning of the start-up of the fuel cell system according to the first embodiment and a detected temperature. As shown in FIG. 2, the temperature detected by the temperature detector approaches the target temperature profile with the elapse of time after the start-up. The beginning of the start-up may be the point in time when fuel in the fuel cell system is ignited.

The method for operating the fuel cell system 100 includes controlling the flow rate of the fuel supplied from the fuel feeder 10 to the reformer 12 such that the temperature detected by the temperature detector 22 approaches the target temperature determined on the basis of the target temperature profile. The expression "becomes equal to a target temperature" does not require that the detected temperature completely coincides with the target temperature and may include the case where the detected temperature approaches the target temperature.

In particular, for example, when the temperature detected by the temperature detector 22 is higher than the target temperature determined on the basis of the target temperature profile, the flow rate of the fuel supplied from the fuel feeder 10 to the reformer 12 may be reduced. When the temperature detected by the temperature detector 22 is lower than the target temperature determined on the basis of the target temperature profile, the flow rate of the fuel supplied from the fuel feeder 10 to the reformer 12 may be increased.

Alternatively, for example, when the temperature detected by the temperature detector 22 is higher than a predetermined range including the target temperature determined on the basis of the target temperature profile, the flow rate of the fuel supplied from the fuel feeder 10 to the reformer 12 may be reduced. When the temperature detected by the temperature detector 22 is lower than the predetermined range, the flow rate of the fuel supplied from the fuel feeder 10 to the reformer 12 may be increased.

The flow rate of the fuel may be increased or reduced by a preset percentage (for example, 10% of the flow rate before change) or a preset flow rate.

Alternatively, the control method used may be, for example, PID control, which is based on the difference between the temperature detected by the temperature detector 22 and the target temperature determined on the basis of the target temperature profile.

Alternatively, for example, when the difference between the temperature detected by the temperature detector 22 and the target temperature determined on the basis of the target temperature profile is equal to or greater than a preset value, the flow rate of the fuel may be increased or reduced by a preset amount.

Thermal degradation due to high temperature at start-up, carbon deposition, and the like can be prevented in such a manner that the target temperature profile is set such that problems with thermal degradation due to high temperature, carbon deposition, and the like do not occur in portions of the fuel cell system 100. The target temperature profile may be determined by experiment or simulation.

The vaporizer 11 may control the amount of steam to be supplied to the reformer 12 to be constant. This enables the temperature of the combustion gas to be accurately detected.

Method for Estimating Composition of Fuel

A method for estimating the composition of fuel used in the fuel cell system 100 includes estimating the composition of the fuel on the basis of the flow rate of the fuel in operation.

The term "flow rate of fuel in operation" may refer to, for example, the flow rate (the term "flow rate" refers to the flow rate per unit time and may be, for example, the flow rate in standard liters per minute (SLM) at 0° C. and 1 atom; the same applies hereinafter) of the fuel supplied from the fuel feeder 10 to the reformer 12 at the point in time when start-up operation is completed, the flow rate of the fuel supplied from the fuel feeder 10 to the reformer 12 at the point in time when start-up operation is started, or the average flow rate of the fuel supplied from the fuel feeder 10 to the reformer 12 in a predetermined period during start-up operation. The point in time when start-up operation is completed may be, for example, the point in time when power generation operation is started. The point in time when power generation operation is started may be, for example, the point in time when drawing a current from the fuel cell 18 is started.

The term "composition" refers to $C_nH_{2n+2}$ virtually represented by the value of n in the case where fuel is supposed to be, for example, an alkane (a substance, such as methane, ethane, or propane, represented by the formula $C_nH_{2n+2}$).

EXAMPLE

A method for operating a fuel cell system according to an example and a method for estimating the composition of fuel are described below.

In this example, the configuration and operating conditions of the fuel cell system have been determined during design on the assumption that 13A gas in Japan is used. On that basis, consider the case where the fuel cell system is operated using L-gas according to the standard G260 prescribed by Deutscher Verein des Gas-und Wasserfaches (DVGW) as fuel.

The configuration of the fuel cell system may be the same as that shown in FIG. 1. Therefore, common components are denoted by the same reference numerals and will not be described in detail.

Gas Composition

First, L-gas is described. City gas is supplied from a gas company to individual homes and the like through a grid. The composition, calorific value, and the like of city gas vary in some cases. For example, in Germany in Europe, the composition and calorific value of gas supplied to individual homes and the like through a grid are controlled in accordance with the standard G260 prescribed by DVGW.

According to this standard, the gas supplied to the grid is categorized into two types, L-gas and H-gas, using the calorific value (Hs), Wobbe index (Ws), and specific gravity (d) of gas as shown in Table 1. Incidentally, the specific gravity of gas is expressed as a relative value based on air (the same applies hereinafter).

TABLE 1

| | | Ws MJ/m³ | Hs MJ/m³ | d — |
|---|---|---|---|---|
| L-gas | Maximum | 46.8 | 47.2 | 0.75 |
| | Minimum | 39.6 | 30.2 | 0.55 |
| H-gas | Maximum | 56.5 | 47.2 | 0.75 |
| | Minimum | 49.0 | 30.2 | 0.55 |

L-Gas
  $30.2 \leq Hs \leq 47.2$ (MJ/m³)
  $39.6 \leq Ws \leq 46.8$ (MJ/m³)
  $0.55 \leq d \leq 0.75$
H-Gas
  $30.2 \leq Hs \leq 47.2$ (MJ/m³)
  $49.0 \leq Ws \leq 56.5$ (MJ/m³)
  $0.55 \leq d \leq 0.75$ Herein, the Wobbe index is given by the following equation:

$$W_s = \frac{Hs}{\sqrt{d}}$$

where Ws is the Wobbe index, Hs is the calorific value of gas, and d is the specific gravity of gas.

Figure 3:
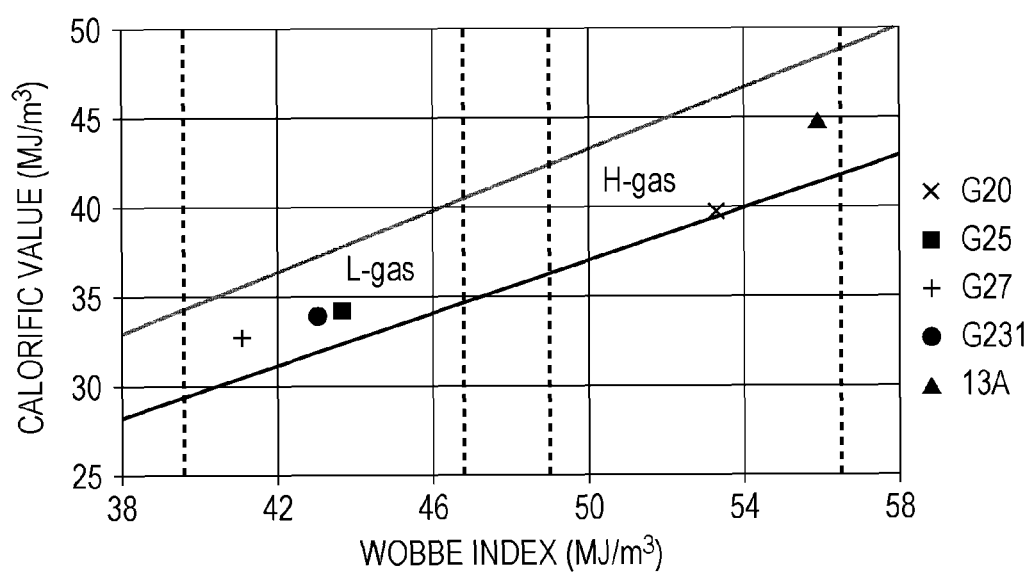
FIG. 3 is a graph showing the relationship between the Wobbe index and calorific value of each gas.

FIG. 3 is a graph showing the relationship between the Wobbe index and calorific value of each gas. In FIG. 3, the range of a parameter of each of L-gas and H-gas is shown, the calorific value (Hs) of gas is plotted on the vertical axis, and the Wobbe index of gas is plotted on the horizontal axis. The graph shown in FIG. 3 is one obtained at 25° C. and 1,013.25 mbar in a dry state.

In FIG. 3, a left region surrounded by dotted lines and solid lines corresponds to L-gas and a right region surrounded by dotted lines and solid lines corresponds to H-gas. For comparison, G20, G25, G27, and G231 which are gas standards in Germany are shown in FIG. 3. For reference, city gas (13A) in Japan is also shown in FIG. 3.

Table 2 shows the composition of each gas.

TABLE 2

| | Calorific value | Specific gravity | H-gas | | L-gas | | |
|---|---|---|---|---|---|---|---|
| | MJ/m³ | — | 13A | G20 | G25 | G27 | G231 |
| $H_2$ | 12.8 | 0.07 | 0% | 0% | 0% | 0% | 0% |
| $CH_4$ | 39.7 | 0.56 | 88.9% | 100% | 86% | 82% | 85% |
| $C_2H_6$ | 69.6 | 1.05 | 6.8% | 0% | 0% | 0% | 0% |
| $C_3H_8$ | 99.1 | 1.55 | 3.1% | 0% | 0% | 0% | 0% |
| $C_4H_{10}$ | 128.1 | 2.09 | 1.2% | 0% | 0% | 0% | 0% |
| $N_2$ | 0 | 0.97 | 0% | 0% | 14% | 18% | 15% |
| $CO_2$ | 0 | 1.53 | 0% | 0% | 0% | 0% | 0% |
| Hs | | | 44.7 | 39.7 | 34.2 | 32.6 | 33.8 |
| Ws | | | 55.9 | 53.4 | 43.7 | 41.1 | 43.0 |
| d | | | 0.64 | 0.56 | 0.61 | 0.63 | 0.62 |

For example, according to the standards used in Germany, the composition and calorific value of city gas, L-gas or H-gas, supplied to individual homes through a grid may possibly vary within a prescribed range. In the case where the composition and calorific value of the city gas deviate from design values, if the flow rate of the city gas remains the same as a preset value, then the temperature of a combustion gas and the temperature of each portion of the fuel cell system deviate from preset values.

In this example, the temporal change of the temperature detected by a temperature detector 22 in the case where the fuel cell system is started up in such a manner that the supply of each of fuel, air, and the like is optimized on the assumption that the fuel used is 13A gas is stored in a storage device 24 in the form of a target temperature profile (refer to FIG. 2).

In Japan, 13A gas is a general city gas and has a composition below.

Methane ($CH_4$): 88.9%
Ethane ($C_2H_6$): 6.8%
Propane ($C_3H_8$): 3.1%
Butane ($C_4H_{10}$): 1.2%

Operating Method

Consider the case where the fuel cell system is placed in an area supplied with L-gas according to G260 and is started up. In particular, consider the case where the fuel cell system is supplied with G27 (82% of $CH_4$ and 18% of $N_2$) which is one of gas standards in Germany.

The calorific value of G27 is 656 kJ/mol. On the other hand, the calorific value of 13A is 903 kJ/mol. The preset target temperature profile is optimized using 13A. Thus, after fuel gas (G27) is supplied and the fuel cell system is started up, the temperature detected by the temperature detector 22 is lower than the temperature determined from the target temperature profile.

Figure 4:
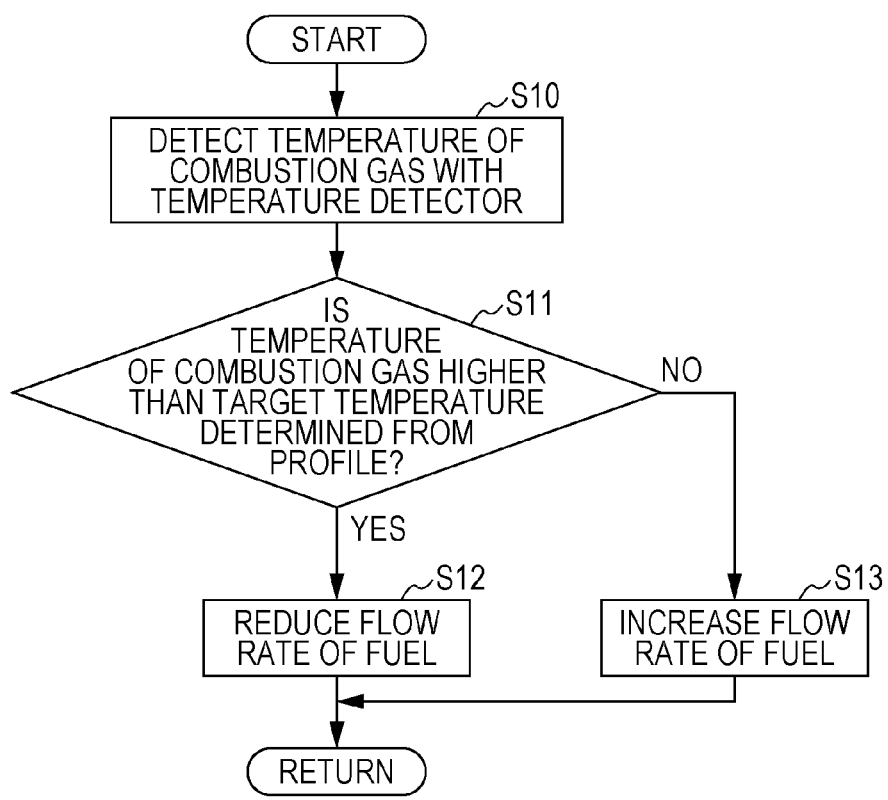
FIG. 4 is a flowchart showing an example of a method for operating a fuel cell system according to an example.

FIG. 4 is a flowchart showing an example of a method for operating the fuel cell system. The method for operating the fuel cell system is described below with reference to FIG. 4. When the storage device 24 is, for example, a controller, control as shown in FIG. 4 can be performed in such a manner that the controller controls portions of the fuel cell system.

In the operating method, after a start-up sequence is started (START), the temperature of the combustion gas is detected by the temperature detector 22 as shown in FIG. 4 (Step S10).

Next, whether the temperature of the combustion gas is higher than a target temperature determined from the target temperature profile is judged (Step S11).

When a judgement result of Step S11 is YES, the flow rate of fuel is reduced (Step S12) and the start-up sequence returns to Step S10 (RETURN).

When a judgement result of Step S11 is NO, the flow rate of fuel is increased (Step S13) and the start-up sequence returns to Step S10 (RETURN).

The above flowchart is particularly simple. In particular, PID control is performed.

Figure 5:
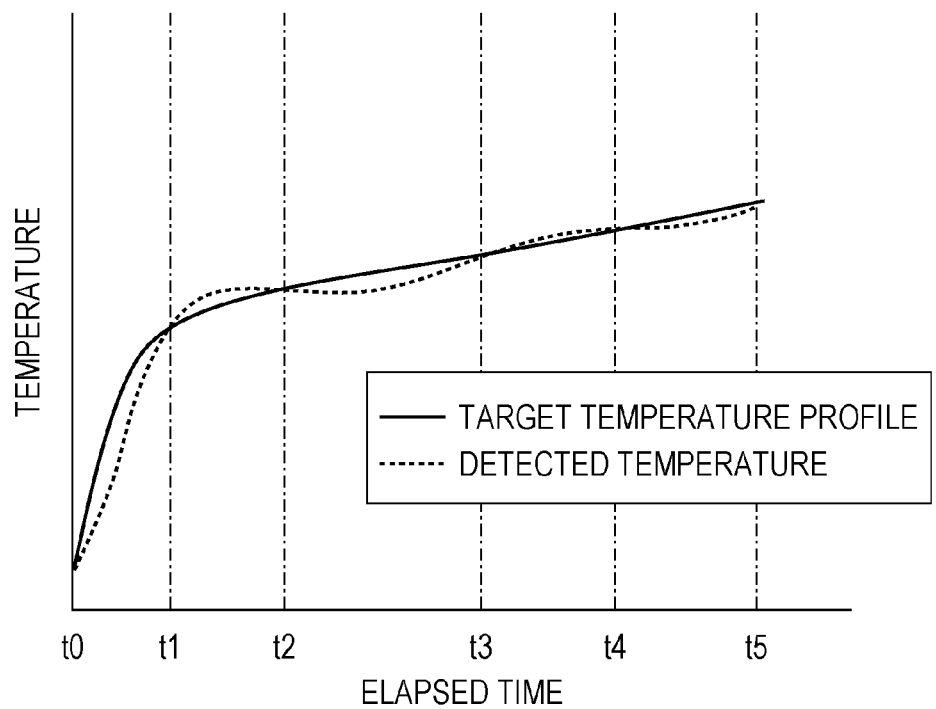
FIG. 5 is a conceptual graph showing the temporal change of temperature in the case where proportional-integral-derivative (PID) control is performed in the fuel cell system according to the example.

FIG. 5 is a conceptual graph showing the temporal change of temperature in the case where PID control is performed in the fuel cell system.

The flow rate of fuel is increased from elapsed time t0 to t1 by PID control, whereby the temperature detected by the temperature detector 22 is increased.

At elapsed time t1, the temperature detected by the temperature detector 22 is higher than the target temperature profile. Therefore, the flow rate of fuel is reduced from elapsed time t1 to t2 by PID control, whereby the temperature detected by the temperature detector 22 is reduced.

At elapsed time t2, the temperature detected by the temperature detector 22 is lower than the target temperature profile. Therefore, the flow rate of fuel is increased from elapsed time t2 to t3 by PID control, whereby the temperature detected by the temperature detector 22 is increased.

Start-up is completed at elapsed time t5 by performing similar control. That is, power generation is started.

Since the flow rate of fuel is controlled as described above, the temperature detected by the temperature detector 22 approaches substantially the same temperature as the target temperature profile. Thus, problems with thermal degradation due to high temperature, carbon deposition, and the like can be prevented.

Method for Estimating Composition of Fuel

In this example, at the point in time when start-up operation is completed, that is, the point in time when start-up operation switches to power generation operation, the calorific value of fuel supplied to the fuel cell system (the calorific value of fuel supplied to a reformer 12) per unit time becomes substantially equal to the calorific value Q0 (kJ/min) of the fuel supplied to the fuel cell system per unit time at the end of start-up operation in the target temperature profile.

Herein, the calorific value (kJ/min) of the fuel supplied to the fuel cell system per unit time is expressed as the product of the flow rate (mol/min) per unit time and the calorific value (kJ/mol) per unit mole as given by the following equation:

$$Q0 = F0 \times H0 \quad (1)$$

where Q0 is the calorific value (kJ/min) of the fuel supplied to the fuel cell system per unit time in the target temperature profile, F0 is the flow rate (mol/min) of the fuel supplied to the fuel cell system per unit time in the target temperature profile, and H0 is the calorific value (kJ/mol) per unit mole of the fuel supplied to the fuel cell system in the target temperature profile.

At the end of start-up operation, Q1 given by the following equation is substantially equal to Q0 because the flow rate of the fuel is controlled as shown in FIG. 4:

$$Q1 = F1 \times H1 \quad (2)$$

where Q1 is the calorific value (kJ/min) of the fuel supplied to the fuel cell system per unit time at the end of start-up operation, F1 is the flow rate (mol/min) of the fuel supplied to the fuel cell system per unit time at the end of start-up operation, and H1 is the calorific value (kJ/mol) per unit mole of the fuel supplied to the fuel cell system at the end of start-up operation.

Supposing that Q1 is equal to Q0, the following equation is derived from Equations (1) and (2):

$$H1 = (F0 \times H0)/F1 \quad (3).$$

In Equation (1), F0 and H0 are preset values and F1 is a value determined at start-up. Thus, the value of H1 is determined from Equation (3).

Figure 6:
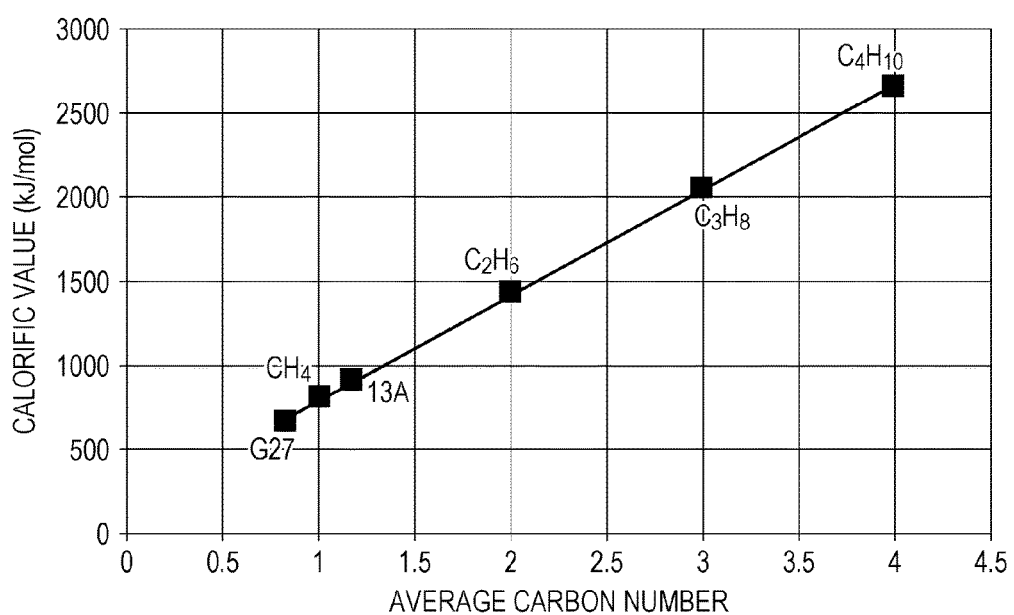
FIG. 6 is a graph showing the relationship between the carbon number and calorific value of each fuel gas.

FIG. 6 is a graph showing the relationship between the carbon number and calorific value of each fuel gas. In the case where the composition of the fuel gas is supposed to be $C_nH_{2n+2}$, the calorific value of the fuel gas is substantially proportional to the value of n (the average carbon number of the fuel gas). Thus, the composition (the value of n in the case where fuel is supposed to be an alkane) of fuel supplied at the end of start-up operation can be calculated from the value of H1. That is, the composition (average carbon number) of the fuel can be estimated.

If the composition of fuel can be estimated, then fuel utilization (Uf) can be accurately set and therefore the possibility of causing starvation can be reduced in power generation operation. Furthermore, S/C can be accurately set and therefore carbon deposition can be suppressed.

As described above, the calorific value (kJ/min) of the fuel supplied to the fuel cell system at the end of start-up operation becomes substantially equal to the calorific value (kJ/min) of the fuel supplied to the fuel cell system under conditions underlying the preparation of the target temperature profile.

The calorific value (kJ/mol) per unit mole of the fuel supplied to the fuel cell system at the end of start-up operation is calculated from Equation (3).

In this example, the flow rate, F1, of the fuel supplied to the fuel cell system per unit time at the end of start-up operation is 0.275 mol/min. The flow rate, F0, of the fuel supplied to the fuel cell system per unit time in the target temperature profile at the end of start-up operation under conditions underlying the preparation of the target temperature profile is 0.2 mol/min. Thus, H1 is calculated as follows: H1=(0.2×903)/0.275=656 (kJ/mol). The average carbon number of the fuel is determined by substituting H1 into an approximate equation for a plot in FIG. 6, that is, the following equation:

$$H1 \text{ (kJ/mol)} = 625 \times \text{average carbon number} + 167 \quad (4).$$

That is, the average carbon number of the fuel can be estimated to be 0.78. This enables Uf and S/C during power generation to be accurately controlled, thereby enabling carbon deposition and starvation during power generation to be suppressed.

The fuel supplied to the fuel cell system may possibly vary in composition and calorific value like city gas (gas supplied through gas pipelines) in Europe. Even in this case, according to this example, the possibility that the temperature of each portion of the fuel cell system significantly deviates from a design value can be reduced with a simple system configuration. Thus, the durability of the fuel cell system can be increased.

In particular, problems with high-temperature thermal degradation, carbon deposition, and the like during start-up can be reduced. Furthermore, the composition of fuel can be estimated and therefore problems with carbon deposition, starvation, and the like during power generation can be reduced.

From the above description, various modifications and other embodiments are apparent to those skilled in the art. Accordingly, the above description is to be construed as illustrative only and is provided for the purpose of teaching those skilled in the art the best mode of carrying out the present disclosure. Details of the structure and/or function may be substantially varied without departing from the spirit of the present disclosure.

An aspect of the present disclosure is useful as a fuel cell system with increased durability.

What is claimed is:

1. A method for operating a fuel cell system including a fuel feeder supplying fuel, a reformer producing a hydrogen-containing gas by a reforming reaction using a reaction gas other than the fuel and the fuel supplied from the fuel feeder, a fuel cell which includes a cathode and an anode and which generates electricity using an oxidant gas supplied to the cathode and the hydrogen-containing gas supplied from the reformer to the anode, a combustor which combusts an anode off-gas discharged from the anode to produce a combustion gas, a temperature detector detecting the temperature of the combustion gas, and a storage device storing a preset target temperature profile, the target temperature profile including a temporal change in target temperature of the combustion gas in the operation of the fuel cell system, the method comprising
controlling the flow rate of the fuel supplied from the fuel feeder to the reformer in the operation such that the temperature detected by the temperature detector becomes equal to a target temperature determined on the basis of the target temperature profile.

2. The method according to claim 1, wherein the fuel cell system includes a vaporizer supplying steam to the reformer and the vaporizer controls the amount of steam to be supplied to the reformer to be constant in the operation.

3. The method according to claim 1, wherein the composition of the fuel supplied in the operation is estimated on the basis of the flow rate of the fuel in the operation and the composition of the fuel that is used as a basis for setting the target temperature profile.

4. The method according to claim 1, wherein the fuel cell is a solid oxide fuel cell.

5. The method according to claim 1, wherein a major component of the fuel is an alkane.

6. The method according to claim 1, wherein the preset target temperature profile is selected depending on outside air temperature, that the preset target temperature profile is stored in the storage device prior to a start-up operation.

7. The method according to claim 1, further comprising controlling the flow rate of the fuel supplied from the fuel feeder to the reformer such that the temperature detected by the temperature detector approaches the target temperature determined on the basis of the target temperature profile.

8. A method for estimating the composition of fuel used in a fuel cell system including a fuel feeder supplying fuel, a reformer producing a hydrogen-containing gas by a reforming reaction using a reaction gas other than the fuel and the fuel supplied from the fuel feeder, a fuel cell which includes a cathode and an anode and which generates electricity using an oxidant gas supplied to the cathode and the hydrogen-containing gas supplied from the reformer to the anode, a combustor which combusts an anode off-gas discharged from the anode to produce a combustion gas, a temperature detector detecting the temperature of the combustion gas, and a storage device storing a preset target temperature profile, the target temperature profile including a temporal change in target temperature of the combustion gas in the operation of the fuel cell system, the method comprising:

controlling the flow rate of the fuel supplied from the fuel feeder to the reformer in the operation such that the temperature detected by the temperature detector becomes equal to a target temperature determined on the basis of the target temperature profile; and estimating the composition of the fuel on the basis of the flow rate of the fuel in the operation.

9. The method according to claim 8, wherein the fuel cell system includes a vaporizer supplying steam to the reformer and the vaporizer controls the amount of steam to be supplied to the reformer to be constant in the operation.

10. The method according to claim 8, wherein the composition of the fuel is used as a basis for setting the target temperature profile.

11. The method according to claim 8, wherein the fuel cell is a solid oxide fuel cell.

12. The method according to claim 8, wherein a major component of the fuel is an alkane.

13. The method according to claim 8, wherein the preset target temperature profile is selected depending on outside air temperature, that the preset target temperature profile is stored in the storage device prior to a start-up operation.

14. The method according to claim 8, further comprising controlling the flow rate of the fuel supplied from the fuel feeder to the reformer such that the temperature detected by the temperature detector approaches the target temperature determined on the basis of the target temperature profile.

\* \* \* \* \*